United States Patent [19]

Roberts

[11] 3,967,268

[45] June 29, 1976

[54] DATA DISPLAY SYSTEMS

[75] Inventor: Allan Roberts, Sutton, England

[73] Assignee: British Broadcasting Corporation, London, England

[22] Filed: June 30, 1975

[21] Appl. No.: 591,876

[30] Foreign Application Priority Data

July 11, 1974 United Kingdom............... 30817/74

[52] U.S. Cl. ........................... 340/324 AD; 340/336

[51] Int. Cl.² ............................................ G06F 3/14

[58] Field of Search .................. 340/324 A, 324 AD

[56] References Cited

UNITED STATES PATENTS

| | | | |
|---|---|---|---|
| 3,750,135 | 7/1973 | Carey et al. | 340/324 AD |
| 3,778,811 | 12/1973 | Gicca et al. | 340/324 AD |
| 3,781,850 | 12/1973 | Gicca et al. | 340/324 AD |
| 3,849,773 | 11/1974 | Katahira et al. | 340/324 AD |

*Primary Examiner*—David L. Trafton
*Attorney, Agent, or Firm*—Robert F. O'Connell

[57] ABSTRACT

In a data display system, data codes are converted by character generators to dot matrix video waveforms for the display of alphanumeric characters and graphical characters (such as segments of graphs or maps), control codes being used to switch between alphanumeric and graphical display modes. In the latter mode, however, certain alphanumeric characters, such as the upper-case alphabet, can still be displayed under the control of a particular bit of the data codes. For one bit value the codes are interpreted as graphical characters. For the other bit value the codes are interpreted as alphanumeric characters.

4 Claims, 3 Drawing Figures

DATA DISPLAY SYSTEMS

The present invention relates to data display systems of the type including a display device and decoding means responsive to digital codes to cause the display device to display selected dots of dot matrices, thereby to display characters and graphical data determined by the digital codes. The display device is commonly a scanning type of device, such as a cathode ray tube, in which case the dots are selected by pulsing the display device on during the scanning action. The display device may, however, consist of an array of dot sources which are individually controlled to select the displayed dots. Such systems normally form receiving systems of a data transmission system which may be a broadcast system in which the digital codes are multiplexed on to a television signal and the display system is a television receiver having the decoding means added thereto, as a built-in unit or as an add-on unit. One such system is described in British patent specification No. 1,370,535.

Known data display systems of the type described usually use a 7 × 5 dot matrix to display characters known as alphanumeric characters and a seven-bit code is used to designate 128 possible characters, including control characters (which are not displayed). The characters are formated in "pages" formed from rows of the alphanumeric characters.

Graphical data, on the other hand, is built up from what will be referred to as graphic characters. A graphic character is a line segment constituted by selected dots of a dot matrix which occupies the rectangular cell normally filled by an alphanumeric character but which can have a smaller resolution than the alphanumeric dot matrix, being a 3 × 2 dot matrix for example. An array of graphic characters can be formed to represent a map outline, for example, the individual line segments building up the complete outline.

For the avoidance of confusion, the term "cell" will be restricted to a cell for a character. The cell is occupied by a dot matrix of which the elementary areas will be referred to as "dots", although, as is known, such dots are actually composed of segments of a scanning drawn during the scanning by the display device, when this is of scanning type.

A displayed page consists of a row and column array of character cells and a mixed display is possible in which selected cells contain alphanumeric characters and other selected cells contain graphic characters. In a mixed display it is necessary to distinguish graphic codes, representing graphic characters, from alphanumeric codes. This may be effected by the use of control codes which are selected ones of the digital codes. The control codes are displayed blank and mark transitions between alphanumeric and graphic modes in which codes are decoded as alphanumeric and graphic characters respectively.

Since the graphic dot matrix has so few dots, a simple code suffices during the graphic mode and, when using a seven-bit code and a six-dot matrix, six of the seven bits can be assigned to the six dots respectively. The graphic character is drawn as those ones of the six dots whose bits have a predetermined one of the values 0 and 1, e.g., the value 1.

Each control code occupies one cell of the page and the display system has to be programmed to display these codes blank. Accordingly, when composing a mixed display, it is necessary to ensure both that blank cells occur "naturally" and that they contain the required control codes. This represents a troublesome constraint, for example when it is desired to display a map outline with place names or weather information thereon.

The object of the present invention is to provide a system which substantially reduces the constraints imposed upon composition of mixed displays.

According to the invention, there is provided a data display system comprising a display device arranged to display characters as selected dots of dot matrices and controlled by decoding means to display alphanumeric characters in selected cells of an array of character cells and graphic characters in other selected cells, the decoding means being responsive to alphanumeric character codes, including control codes, to switch between alphanumeric and graphic modes in dependence upon the control codes and, in the alphanumeric mode, to control the display of the alphanumeric characters in accordance with the alphanumeric codes other than the control codes, the decoding means being further responsive in the graphic mode to a first restricted set of the codes to control the display of the graphic characters and to a second restricted set of the codes to control the display of a restricted set of the alphanumerical characters.

The first and second restricted sets of codes are preferably distinguished by a single bit, which is 0 for one of the two sets and 1 for the other set. The second restricted set of codes is preferably the set pertaining to the upper-case alphabet. Further description of the invention will be confined, by way of example, to these preferences and moreover to the particular properties of the standard ASCII and ISO-7 codes, both 7-bit codes well known in data transmission and display systems. Both these codes moreover have bit 6 equal to 0 for all upper case characters. Accordingly, in the graphic mode, a code with bit 6 = 1 is not decoded as an alphanumeric code but as a graphic code, whereas a code with bit 6 = 0 is decoded as an alphanumeric code just as if the system were in the alphanumeric code.

The system according to the invention preferably includes in the decoding means an alphanumeric character generator, a graphic character generator, and first switching means controlled by the control codes and operative in the alphanumeric mode to apply the output of the alphanumeric character generator to the display device and operative in the graphic mode to apply to the display device the output of the graphic character generator in one state of a second switching means and the output of the alphanumeric character generator in the other state of the second switching means, the second switching means assuming its first or second state in dependence upon the value of a single predetermined bit of each character code.

The invention, therefore, leads to a much reduced need for the use of control characters (and corresponding blank cells). So long as it is not required to go outside the said restricted set of alphanumerical characters, a mixed display can be achieved solely in the graphic mode. Nevertheless, the possibilities remain of switching modes when desired and of displaying the full set of alphanumeric characters in the alphanumeric mode.

The invention will be described in more detail, by way of example, with reference to the accompanying drawings, wherein.

Figure 1:
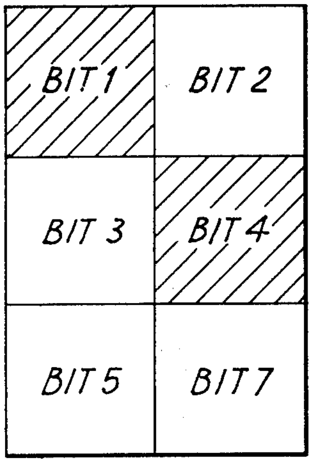
FIG. 1 shows a dot-matrix for graphic characters.

FIG. 1 shows a 3 × 2 dot matrix with each dot labelled with the corresponding bit. It will be noted that only bits 1 to 5 and 7 are used. If it is, for example, desired to draw the diagonal line segment represented by the shaded dots, the graphic character code is 1001000, i.e. only bits 1 and 4 are equal to 1. Bit 6 is always 0 for a graphic character.

Figure 2:
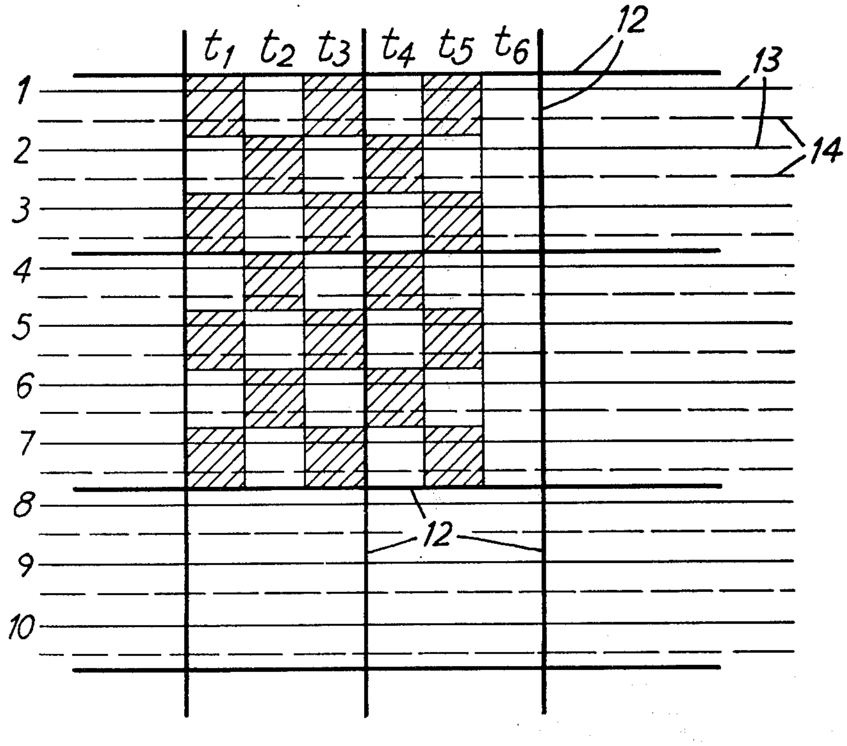
FIG. 2 shows the relationship between the dot-matrices for graphic and alphanumeric characters.

FIG. 2 shows the graphic matrix of FIG. 1 drawn in heavy lines 12 and superimposed on the scanning lines 13 and 14 of odd and even television fields respectively. The matrix completely fills a character cell, being contiguous with the neighbouring graphic matrices. FIG. 2 illustrates one possible arrangement in which the upper and lower pairs of dots have a height of 3 lines per field, i.e. 6 lines per picture while the middle pair of dots has a height of 4 lines per field, i.e. 8 lines per picture. The total cell height is thus 10 lines per field.

Alphanumeric characters, on the other hand, have to be displayed with inter-character and inter-row spaces. The smaller 7 × 5 dot matrix which provides for these spaces has been shaded in chequer-board fashion simply to make the matrix easy to see. Each dot is 1 line per field high, i.e. 2 picture lines high.

Each character cell is treated (in each field) as an array defined by ten lines, which have been numbered 1 to 10 for the odd lines only in FIG. 2, and six time slots $t_1$ to $t_6$. Display of both alphanumeric and graphic characters is effected in a manner known per se and therefore not described in detail. Briefly, a row of characters is buffered and in each line scan, a character generator blanks and unblanks the scanning beam of a television receiver 15 (FIG. 3) during $t_1$ to $t_6$ for character cell 1, then for character cell 2, and so on.

Figure 3:
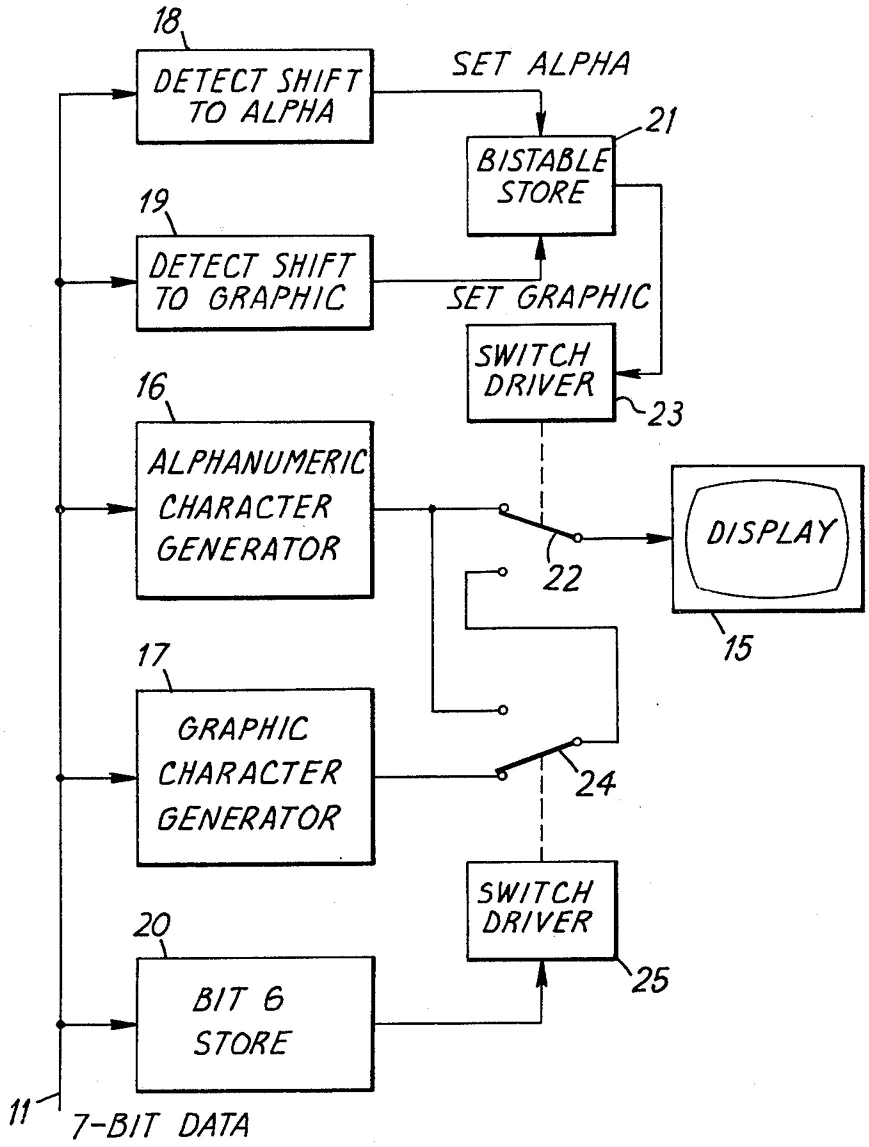
FIG. 3 is a block diagram of a system embodying the invention.

In the case of the alphanumeric generator 16 of FIG. 3, the beam is always blanked during $t_6$ and during lines 8, 9 and 10. The generator completely specifies every one of the 35 intersections of lines 1 to 7 and time slots $t_1$ to $t_5$ for every character as either "unblank" or "blank". In known generators a bit counter counts off the dot positions $t_1$ to $t_6$, a character counter counts off the character cells of a row, a line counter counts off the lines 1 to 10 of a row and a field flip-flop marks the odd and even fields. A ROM is fed with the codes of the characters in turn in each line scan, from the character buffer and under control of the character counter, and decodes the characters to blank and unblank logical levels in dependence on the states of the line counter and bit counter. A typical prior art arrangement is described in "Character/Symbol Generation by MOS Read Only Memory", A. W. Muoio, Proceedings Society for Information Display, Vol. 11 No. 1, First Quarter 1970, pages 6 – 15. Another arrangement is described in the aforementioned British patent specification No. 1,370,535.

The graphic character generator 17 on the other hand responds to bit 1 = 1 to unblank the beam during $t_1$, $t_2$ and $t_3$ of each of lines 1 to 3, and so on in a manner which can be ascertained by inspection of FIG. 2. A very simple ROM therefore suffices in this character generator.

Turning now to a detailed consideration of FIG. 3, the decoding means for the incoming 7-bit data on a line 11 consist of the character generators 16 and 17, of which the generator 16 responds only to bits 1 to 5 and 7, 7-bit detectors 18 and 19 which respectively detect the control codes meaning "shift to alphanumeric mode" and "shift to graphic mode", and a bistable store 20 which stores the value of the bit 6 pertaining to a character cell.

A bistable store 21 stores the current mode and operates a switch 22 accordingly via a driver 23. In the alphanumeric mode the switch 22 is set as shown and applies the output of the alphanumeric character generator 16 to the display device 15. In the graphic mode, the switch 22 is changed over to apply the output of another switch 24 to the display device. The switch 24 is controlled by the bit 6 store 20 via a driver 25 and is positioned as shown when bit 6 = 1. The switch 24 then selects the output of the graphic character generator 17. When bit 6 = 0, the switch 24 changes over to select the output of the alphanumeric generator 16 for generation of an upper case letter.

Although shown as electromechanical switches, the switches 22 and 24 will, in practice, be semi-conductor switches.

It will be appreciated that the 7-bit codes on line 11 are required in succession during each of scans 1 to 10 of FIG. 2. The codes for a whole row of characters are buffered and repeatedly read out, once per line, in synchronism with the scanning of the row of character cells. The control codes as well as character codes are therefore available in sequence in each line scan.

What is claimed is:

1. A data display system comprising a display device arranged to display characters as selected dots of dot matrices, decoding means responsive to character codes to control the display device to display alphanumeric characters in selected cells of an array of character cells and graphic characters in other selected cells, the decoding means being responsive to the alphanumeric character codes, including control codes, to switch between alphanumeric and graphic modes in dependence upon the control codes and, in the alphanumeric mode, to control the display of the alphanumeric characters in accordance with the alphanumeric codes other than the control codes, the decoding means being further responsive in the graphic mode to a first restricted set of the codes to control the display of the graphic characters and to a second restricted set of the codes to control the display of a restricted set of the alphanumerical characters.

2. A data display system according to claim 1, wherein the codes are binary codes and the first and second restricted sets of codes are distinguished by a single bit wich is 0 for one of the two sets and 1 for the other set.

3. A data display system according to claim 1, wherein the second restricted set of codes in the set pertaining to the upper-case alphabet.

4. A data display system according to claim 1, wherein the decoding means comprises an alphanumeric character generator, a graphic character generator, first switching means controlled by the control codes and second switching means operative to assume a first or a second state in dependence upon the value of a single predetermined bit of each character code, the first switching means being operative in the alphanumeric mode to apply the output of the alphanumeric character generator to the display device and being operative in the graphic mode to apply to the display device the output of the graphic character generator in one state of the second switching means and the output of the alphanumeric character generator in the other state of the second switching means.

* * * * *